United States Patent
Cheal

(10) Patent No.: US 6,802,681 B2
(45) Date of Patent: Oct. 12, 2004

(54) FASTENING ELEMENT

(75) Inventor: Jonathan Paul Anthony Cheal, Staffordshire (GB)

(73) Assignee: ITW Limited (GB)

( * ) Notice: Subject to any disclaimer, the term of this patent is extended or adjusted under 35 U.S.C. 154(b) by 0 days.

(21) Appl. No.: 10/298,583

(22) Filed: Nov. 19, 2002

(65) Prior Publication Data
US 2003/0095847 A1 May 22, 2003

(30) Foreign Application Priority Data

Nov. 20, 2001 (GB) .............................................. 0127734
Sep. 23, 2002 (GB) .............................................. 0222012

(51) Int. Cl.⁷ .......................... F16B 31/02; F16B 37/14
(52) U.S. Cl. ............................... 411/431; 411/8; 411/9; 411/429
(58) Field of Search ....................... 411/8, 9, 14, 372.5, 411/372.6, 427, 429, 431, 433, 533, 917, 373, 374

(56) References Cited

U.S. PATENT DOCUMENTS

| | | | | |
|---|---|---|---|---|
| 2,554,794 A | * | 5/1951 | Kimbell ...................... 178/17 D |
| 3,150,556 A | * | 9/1964 | Churchill ..................... 411/520 |
| 3,198,229 A | | 8/1965 | Beltoise ........................ 411/290 |
| 3,548,704 A | | 12/1970 | Kutryk .......................... 411/428 |
| 3,796,123 A | * | 3/1974 | Duffy et al. .................. 411/427 |
| 3,841,177 A | | 10/1974 | Watterback .................. 81/52.5 |
| 4,132,145 A | * | 1/1979 | Becker ......................... 411/427 |
| 4,169,630 A | * | 10/1979 | Wagner .................. 301/35.623 |
| 4,479,747 A | * | 10/1984 | Pagel ............................. 411/8 |
| 4,659,273 A | * | 4/1987 | Dudley ......................... 411/373 |
| 4,708,550 A | | 11/1987 | Hamilton ....................... 411/3 |
| 4,969,788 A | | 11/1990 | Goiny ........................ 411/373 |
| 5,090,854 A | * | 2/1992 | Hafeli et al. ................. 411/186 |
| 6,220,801 B1 | | 4/2001 | Lin ................................ 411/9 |

FOREIGN PATENT DOCUMENTS

| | | | | |
|---|---|---|---|---|
| GB | | 637562 | 5/1950 | |
| GB | | 2 098 695 A | * 11/1982 | ................. 411/427 |
| WO | | WO 94/02749 | 2/1994 | |

* cited by examiner

Primary Examiner—Robert J. Sandy
Assistant Examiner—Ruth C. Rodriguez
(74) Attorney, Agent, or Firm—Lowe Hauptman Gilman & Berner LLP

(57) ABSTRACT

A fastening element is adapted to cooperate with a tie member to exert a compressive force on first and second components. The fastening element has an inner portion (50) resiliently joined to an outer portion (52), such that when a tensile reaction force is applied to the tie member as a result of the compressive force, the reaction force causes the outer portion (52) to be displaced relative to the inner portion (50). The fastening element may further include a washer (56) rotatably attached to the outer portion (52) by a cage (54). An indicator element for use with such a fastening element is also provided, together with a method of securing a first component to a second component by means of such a fastening element.

30 Claims, 6 Drawing Sheets

FASTENING ELEMENT

FIELD OF THE INVENTION

This invention relates to a fastening element for use with a tie member to fasten a first component to a second component, to an indicator element for use with such a fastening element to indicate fastness of said components, and to a method of securing a first component to a second component using such an element and a tie member.

BACKGROUND OF THE INVENTION

It is well known to fasten two or more components together by passing a bolt through the components and tightening a nut onto the bolt, so that the bolt head and nut each exert a clamping force on the components.

Vibration and flexure of the components tend to loosen the nut on the bolt, and such loosening is prevented only by friction between the bolt head and nut and the components.

Where the components are relatively compliant, the nut may have to be loosened by up to three turns before all of the clamping force on the components is lost. Where, on the other hand, the components are relatively stiff, the nut may have to be loosened by as little as one ninth of a turn before all of the clamping force is lost. The loss of the clamping force substantially reduces the friction between the bolt head and nut and the components, allowing the nut to move freely relative to the bolt until the components eventually separate.

It is known to interpose a split or spring washer between the nut and the component, the washer being compressed by the clamping force exerted on the components and expanding against the component and nut in the event of a momentary reduction of the clamping force, for example due to flexure of the components, so as to prevent the nut from loosening. However, the use of split or spring washers is not particularly effective and introduces an undesirable complication into an assembly line.

A particular combination of components, nut and bolt will have an optimum clamping force, which gives a high degree of friction between the bolt head, nut and components, but avoids excessive distortion of the components, snapping the bolt or stripping the threads of the bolt or nut.

Once the optimum clamping force has been determined, taking into account thread pitch, bolt diameter, loaded bolt length, and lubricity, surface finish and dimensional variation of the components, the clamping force is obtained by applying a predetermined torque to the nut.

At present, the only method of determining whether a nut has been correctly tightened is by means of a torque spanner. However, if the nut has been correctly tightened, the application of the torque spanner to the nut will cause the nut to be further tightened, and the optimum clamping force to be exceeded.

SUMMARY OF THE INVENTION

According to a first aspect of the invention there is provided a fastening element for use with a tie member to fasten a first component to a second component, the fastening element being adapted for attachment to the tie member, which in use passes through a part of at least one of the components, and for cooperating with the tie member to exert a compressive force on the components, characterised in that the element comprises an inner portion resiliently joined to an outer portion, in such a way that, when a tensile reaction force is applied to the tie member as a result of said compressive force, said force causes the outer portion to be displaced relative to the inner portion.

The invention therefore provides a fastening element for use with a tie member, which element enables the magnitude of a tensile force applied to the tie member to be determined without altering the magnitude of the force, and which is operable to prevent relative movement of the fastening element and the tie member in the event of a momentary reduction of the compressive force on the components.

Preferably the inner portion is formed integrally with the outer portion.

Preferably the relative position of the inner and outer portions is such that the displacement of the outer portion relative to the inner portion is an axial displacement.

The fastening element may be attached to the tie member by any convenient means, for example crimping onto, or welding to, the member, or may be integrally formed with the tie member. Preferably, however, the inner portion is tapped so as to be engageable with a threaded portion at a first end of the member.

Said compressive force may be exerted by means of a nut tightened against the second component onto a threaded portion at a second end of the member, but preferably the outer portion of the element is formed with flats for engagement with a spanner or like tool, such that the compressive force and hence the tensile reaction force may be applied by means of tightening the element, against the first component, onto the threaded portion at the first end of the member. In this case the second end of the member may be formed with a head for engagement with the second component, or be fastened to the second component, for example by welding, or the member may be integrally formed with the second component.

The fastening element may advantageously be formed from sheet or strip spring steel.

Preferably, the fastening element comprises a nut, for use with a tie member in the form of a bolt or stud.

The fastening element may advantageously further comprise a washer that is rotatably attached to the nut, and that, in use, is interposed between the nut and the components.

Preferably the washer is annular, such that in use, the tie member passes through the washer.

The fastening element may advantageously further comprise cage means having first and second pluralities of axial, radially inwardly projecting claws, the first plurality of claws being engageable with the nut and the second plurality of claws being engageable with the washer.

In a preferred embodiment of the fastening element the nut is formed with a generally frusto-conical portion and the annular washer is formed with a continuous groove in its external circumference, and the first plurality of claws of the cage are engageable with the frusto-conical portion of the nut and the second plurality of claws are engageable with the groove of the washer.

Preferably the washer is formed from hardened steel and the cage is formed from mild or spring steel.

In this way during tightening of a tapped fastening element onto a threaded tie member against a component, the nut rotates against the washer rather than against the component, and there is little, if any, relative movement between the washer and the component, such that scoring of the surface of the component is much reduced.

According to a second aspect of the invention there is provided an indicator element for use with a fastening element in accordance with the first aspect of the invention, the indicator element being releasably engageable with a fastening element such that the indicator element is retained by the fastening element when the outer portion of the fastening element is displaced relative to the inner portion, and released if the displacement of the outer portion relative to the inner portion decreases substantially.

The second aspect of the invention therefore provides an indicator element that may be engaged with a fastening element in accordance with the first aspect of the invention, once the fastening element is exerting a desired compressive force on a component, but which will be released from the fastening element if the compressive force decreases by a substantial amount, for example due to loosening of the fastening element, and hence provides a visual indication of the decrease in the compressive force.

Moreover, the indicator element enables a very quick check to be carried out of whether a fastening element is exerting a desired compressive force on a component, simply by attempting to engage the indicator element with the fastening element, since the indicator element will be retained only if the fastening element is exerting the desired compressive force.

The indicator element may advantageously be adapted to be engageable with an internal surface of the outer portion of the fastening element when the outer portion is displaced relative to the inner portion.

In a preferred embodiment the indicator element comprises a cap for placing over the fastening element, the cap having a central internal tubular member with a perpendicularly outwardly projecting lip that is engageable with an internal surface of the outer portion of the fastening element when the outer portion is displaced relative to the inner portion. When the outer portion is not displaced relative to the inner portion, the external surface of the inner portion occludes the internal surface of the outer portion, such that the lip of the tubular member cannot engage with the internal surface of the outer portion.

The indicator element may advantageously be formed from a plastics material.

Preferably the indicator element is formed from nylon-66.

According to a third aspect of the invention there is provided a method of securing a first component to a second component, by means of a fastener comprising an element as hereinabove described and a tie member, the method comprising the steps of applying a progressively increasing compressive force to the two components, by means of the fastener, and determining whether said displacement of the inner portion relative to the outer portion reaches a minimum magnitude indicative of the soundness of the attachment of the two components.

The step of determining whether the displacement reaches a minimum magnitude may advantageously be by measurement of the displacement of the inner portion relative to the outer portion.

Preferably the step of determining whether the displacement reaches a minimum magnitude is by visual inspection of the displacement of the inner portion relative to the outer portion.

Alternatively, the step of determining whether the displacement reaches a minimum magnitude may advantageously be by attempting to engage an indicator element as hereinbefore described with the fastening element, and observing whether the indicator element is retained by the fastening element.

The method may advantageously further comprise the step of determining whether the displacement of the inner portion relative to the outer portion is less than a maximum magnitude, corresponding to a maximum desired magnitude of compressive force.

Preferably the inner portion of the fastening element is tapped and a first end of the tie member has a threaded portion, the step of applying the compressive force being achieved by screwing the tapped inner portion of the element onto the threaded portion of the member.

Preferably the outer portion of the fastening element is formed with flats for engagement with a spanner or like tool, and the step of applying said force is achieved by applying a torque to the fastening element.

The invention also lies in a nut comprising a fastening element as hereinabove described and a bolt for use therewith.

BRIEF DESCRIPTION OF THE DRAWINGS

The invention will now be described by way of illustrative example and with reference to the accompanying drawings, in which.

DETAILED DESCRIPTION OF AN EMBODIMENTS

Figure 1:
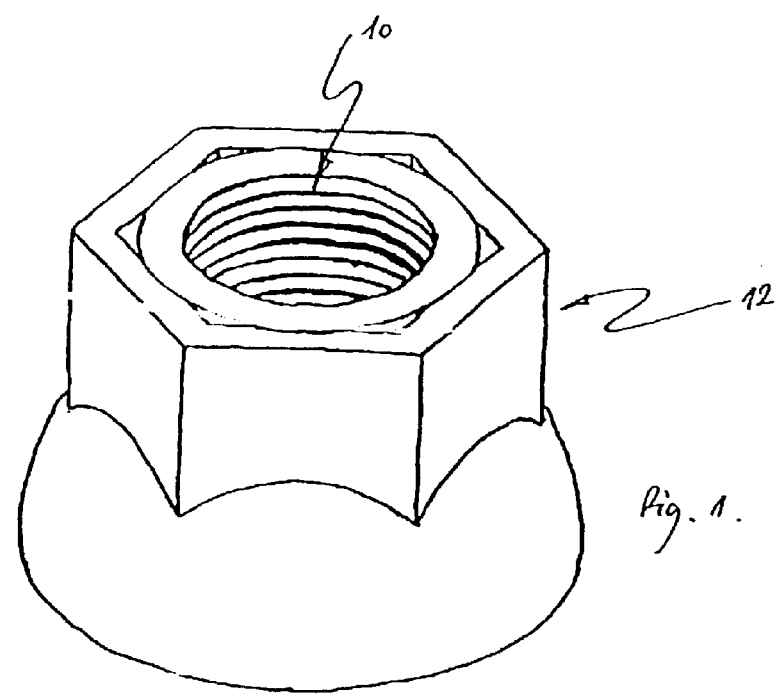
FIG. 1 is a perspective view of a first nut in accordance with the first aspect of the invention.

The first nut of FIG. 1 consists of an inner portion 10 and an outer portion 12, the inner and outer portions being integrally formed as a single component from spring steel.

Figure 2:
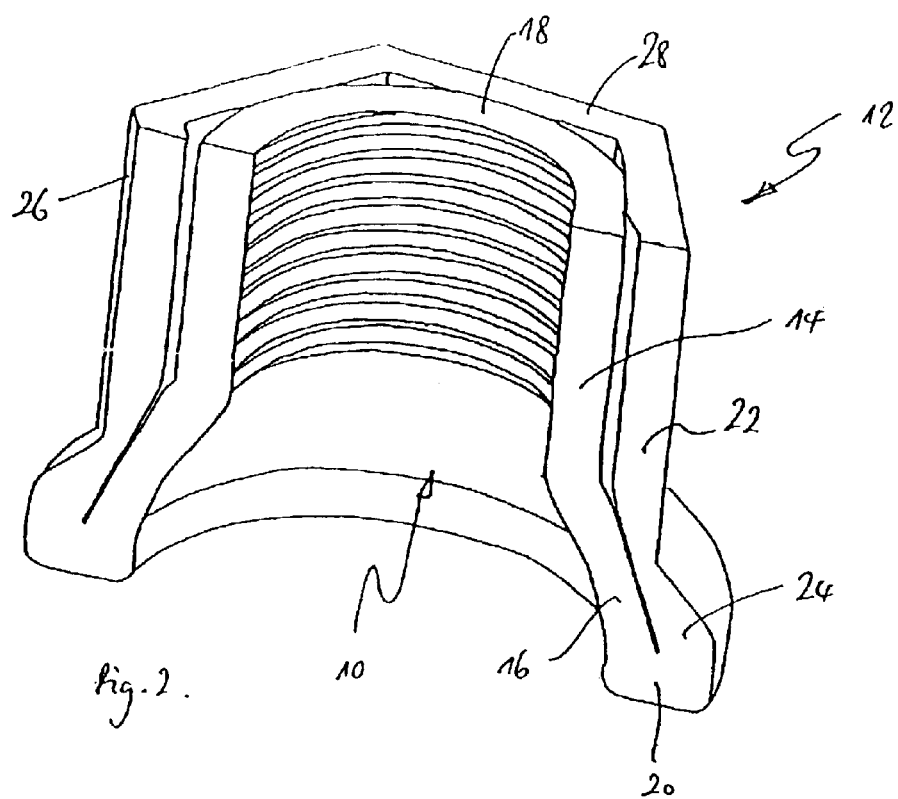
FIG. 2 is a sectional view of the first nut.

Turning to FIG. 2, the inner portion 10 is generally tubular, having a cylindrical neck 14 and a frusto-conical skirt 16. The internal surface of the neck is tapped for engagement with the threads of a bolt or stud (not shown). The external surface of the neck 14 is cylindrical. The end surface 18 of the neck 14 is planar. The internal and external surfaces of the skirt 16 are frusto-conical and the end surface of the skirt forms a first part of the base 20 of the nut.

The outer portion 12 is also generally tubular, having a hexagonal neck 22 and a generally frusto-conical skirt 24. The internal and external surfaces of the neck 22 are hexagonal, the six flats of the external surface, one of which, 26, is visible in FIG. 2, being adapted to enable the nut to be tightened onto the bolt or stud by, for example, a torque spanner. The end surface 28 of the neck 22 is also planar. The internal and external surfaces of the skirt 24 are generally frusto-conical, and the end surface of the skirt forms a second part of the base 20 of the nut.

The nut is complicate in structure, such that the skirt 16 of the inner portion 10 is joined at the base 20 of the nut to the skirt 24 of the outer portion 12, the external surface of the skirt 16 is in contact with the internal surface of the skirt 24, and the cylindrical external surface of the neck 14 is in contact with the hexagonal internal surface of the neck 22 at the midpoint of each of its sides. When the nut is not stressed, the end surfaces of the inner and outer portions, 18 and 28 respectively, are coplanar.

In use, the nut is tightened onto a bolt that passes through part of a component, until the base 20 of the nut engages with the component. As the nut is tightened further onto the bolt against the component, the force exerted by the threads of the bolt on the tapped internal surface of the inner portion causes the end surface 18 of the inner portion to move downwards relative to the end surface 28 of the outer portion, as the skirt 16 of the inner portion, partially collapses. As this happens, the radius of the base of the nut remains unchanged, the skirt 16 thus collapsing in a similar fashion to a rubber plunger for unblocking domestic waste water pipes. The relative displacement of the end surfaces 18 and 28 is proportional to the tensile reaction force exerted on the bolt (as a result of the compressive force exerted by the nut and bolt on the components being fastened together), and therefore provides an indication, measurable with a micrometer, for example, if not discernible by the naked eye, of whether the nut has been correctly tightened.

Figure 3:
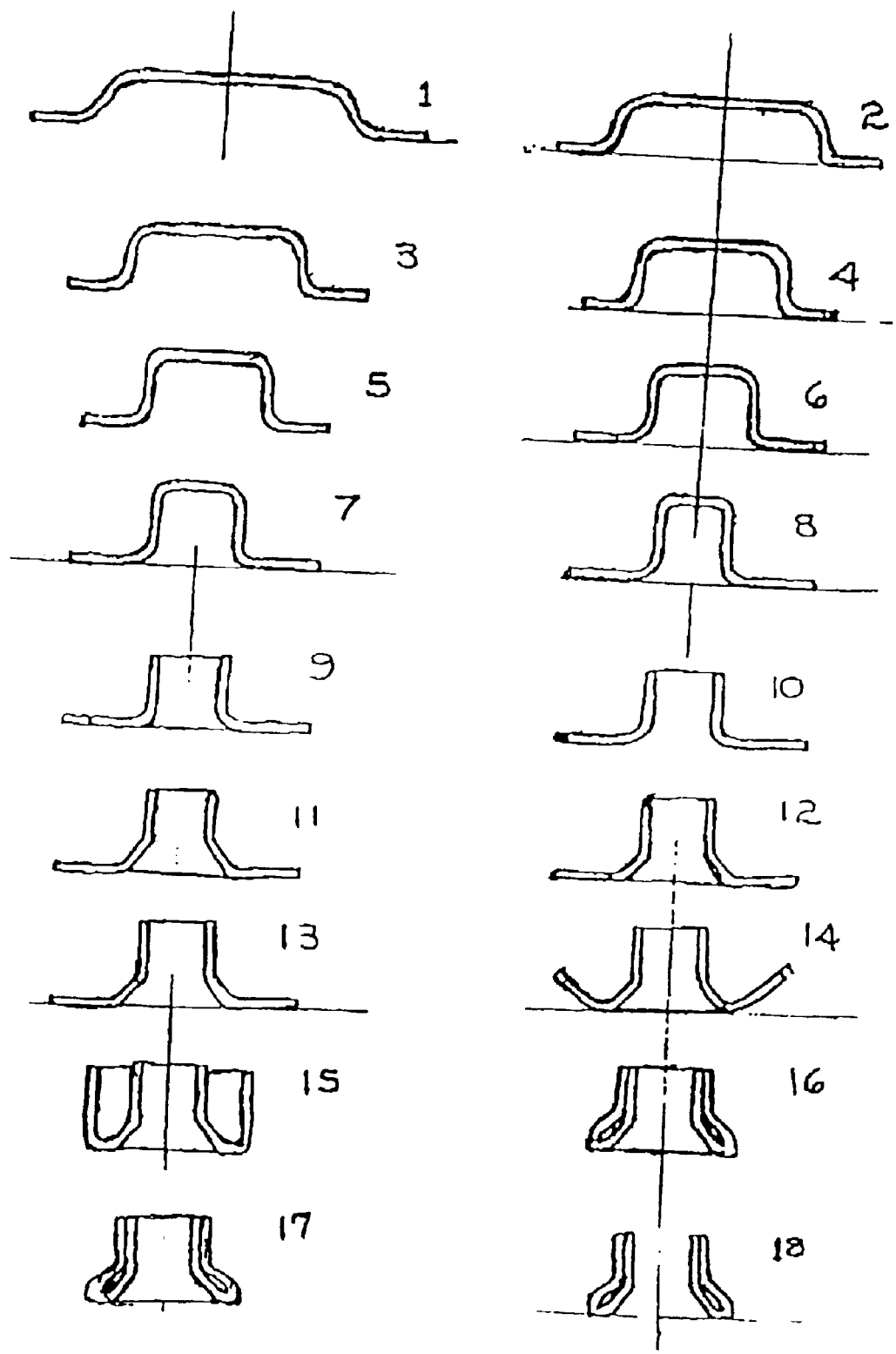
FIG. 3 is a representation of the manufacturing process of the first nut.

Turning next to FIG. 3, the nut is formed from a sheet of spring steel. Stages 1 to 12 show a deep drawing operation in which the neck and skirt of the inner portion of the nut are formed and a central hole is punched in the end surface of the neck, leaving a circular flange projecting radially from the base of the skirt.

Stages 13 to 15 show a redrawing operation in which a cupped die encloses the neck and skirt of the inner portion of the nut and bears on the circular flange. The cupped die drives the inner portion of the nut into a funneled die, thereby bending the circular flange upwards so as to surround the inner portion of the nut.

Figure 4:
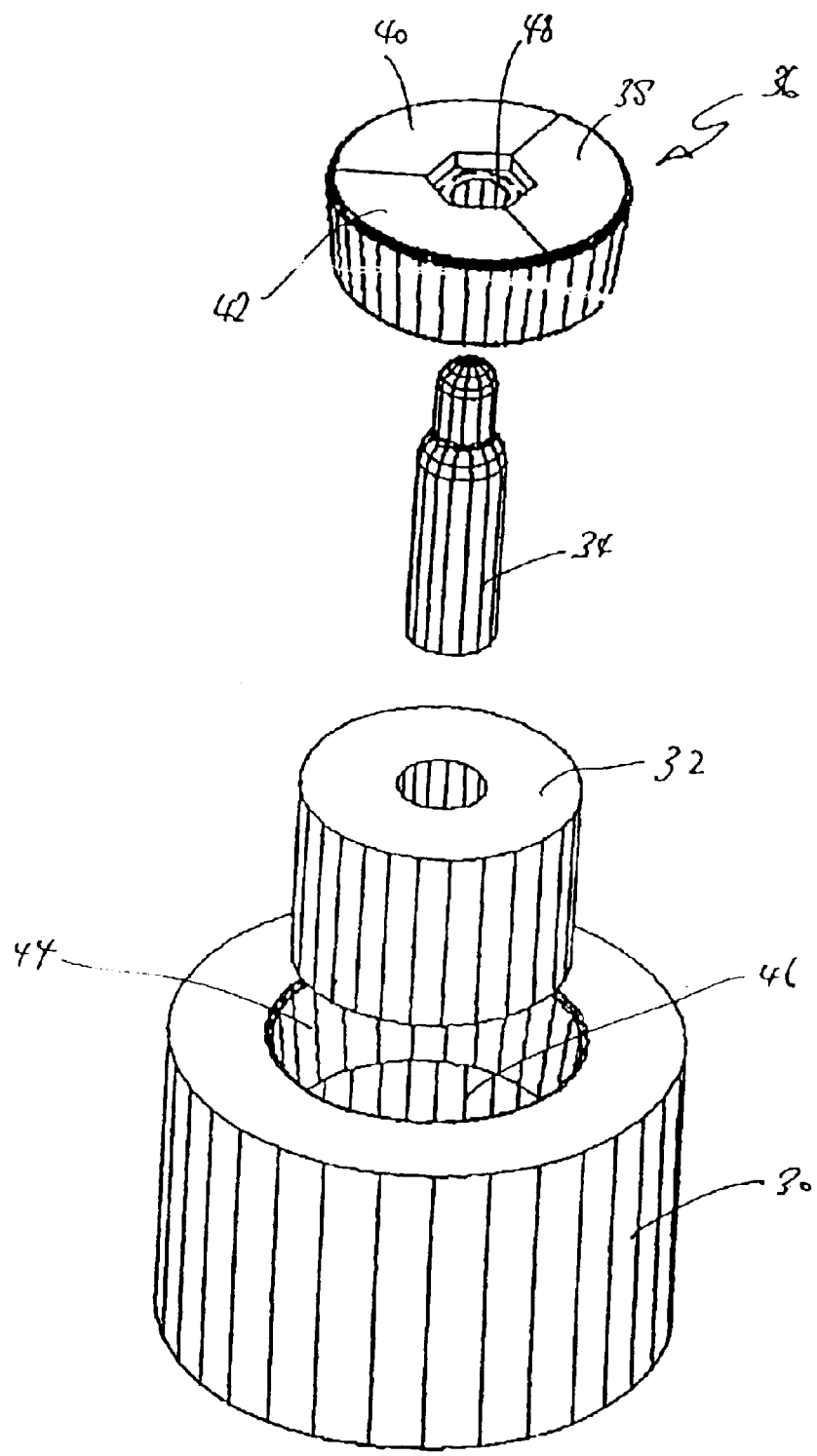
FIG. 4 is an exploded view of a tool used in the manufacturing process.

Stages 16 and 17 show a simulated cam tool operation, in which the hexagonal form is imparted to the outer portion of the nut. The simulated cam tool is shown in FIG. 4, and comprises a die block 30, base 32, mandril 34 and split collet 36. The split collet 36 is made up of three identical segments 38, 40 and 42.

The die block 30 is hollow, the internal surface having an upper, tapered portion 44 and a lower, parallel-sided portion 46. The lower, parallel-sided portion 46 is sized to receive the base 32, which has a central, parallel-sided hole sized to receive the mandril 34. The tip of the mandril fits inside the inner portion of a nut 48, which is partially visible in the split collet 36. The split collet fits around the nut. In FIG. 4 the three segments 38, 40 and 42 of the split collet are shown enclosing the nut 48, and in contact with one another. In practice this would not be possible until the simulated cam tool operation had been completed.

The external surface of the split collet is tapered, and sized such that with a nut placed between the three segments of the collet, the narrow end of the collet just fits into the upper, wide part of the internal taper of the die block. The internal surface of the split collet is hexagonal and the simulated cam tool operation consists of forcing the split collet containing the nut into the die block in which the base and mandril are held. The tapered portion 44 of the die block forces the three segments of the split collet inwards, thereby forming the hexagonal external surface of the outer portion. The base serves to centre the mandril relative to the die block and split collet, and the mandril ensures that the forces are applied symmetrically around the nut by the split collet.

Returning to FIG. 3, stage 18 shows a roll form tapping operation, in which an internal thread is formed on the internal surface of the inner portion of the nut.

Figure 5:
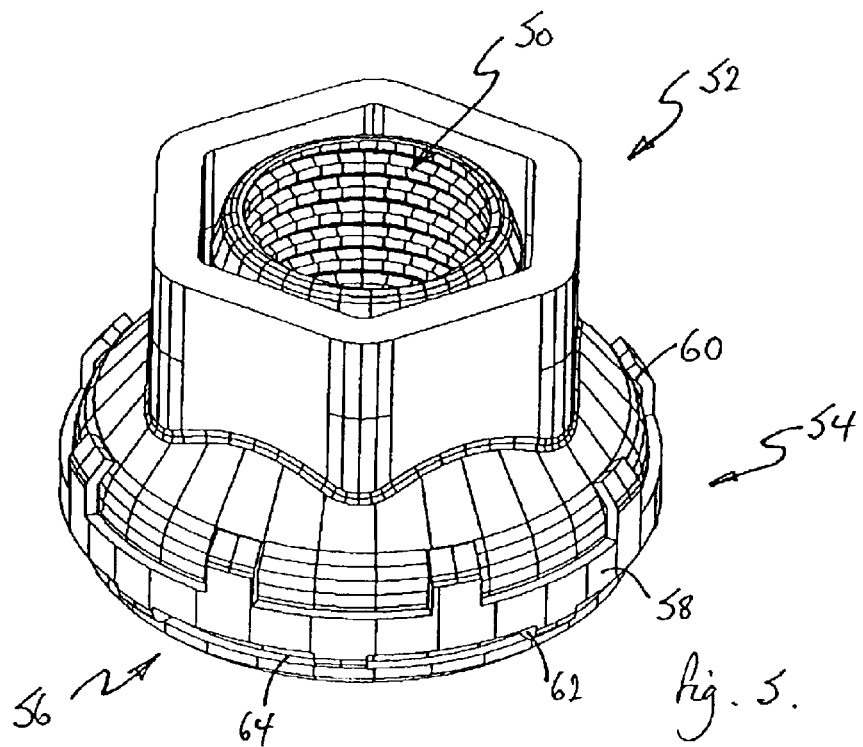
FIG. 5 is a perspective view of a second nut.

The second nut of FIG. 5 consists of an inner portion 50, an outer portion 52, a cage 54 attached to the outer portion 52 and to a washer 56. The inner and outer portions are integrally formed as a single component from spring steel, the cage is formed from spring steel and the washer is made of hardened steel.

Figure 6:
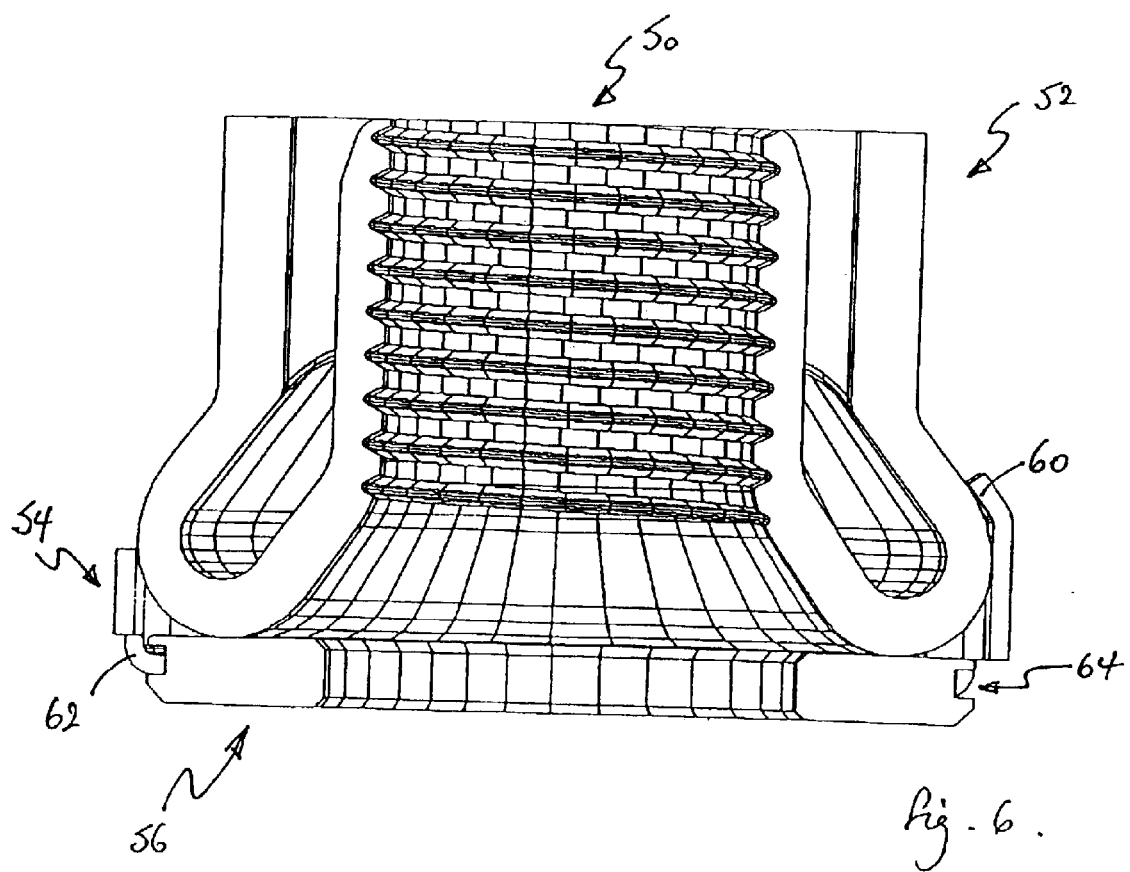
FIG. 6 is a sectional view of the second nut.

Turning to FIG. 6, the inner and outer portions of the second nut are substantially as described in relation to the first nut. However, the end surface of the neck of the inner portion is convex rather than planar, and the external surface of the skirt and neck of the inner portion, and the internal surface of the skirt and neck of the outer portion define an annular cavity inside the nut. When the nut is not stressed the apex of the convex end surface of the neck of the inner portion and the end surface of the neck of the outer portion are coplanar.

Returning to FIG. 5, the cage 54 consists of a hoop 58 formed with long, radially inwardly directed claws 60 that project axially from one edge of the hoop, and short, radially inwardly directed claws 62 that project axially from the other edge of the hoop. The hoop is formed with nine long claws and nine short claws, which are disposed equidistantly around the edges of the hoop. In FIG. 5 six long claws and three short claws are visible.

The washer 56 is annular and formed with a continuous groove 64 in its external circumferential surface.

The short claws of the cage are engageable with the groove in the washer, and the long claws are engageable with the external surface of the skirt of the outer portion. With the long claws engaged with the skirt of the outer portion and the short claws engaged with the groove in the washer, the washer is retained adjacent to the base of the skirt, but capable of rotational movement relative to the inner and outer portions of the nut.

Figure 7:
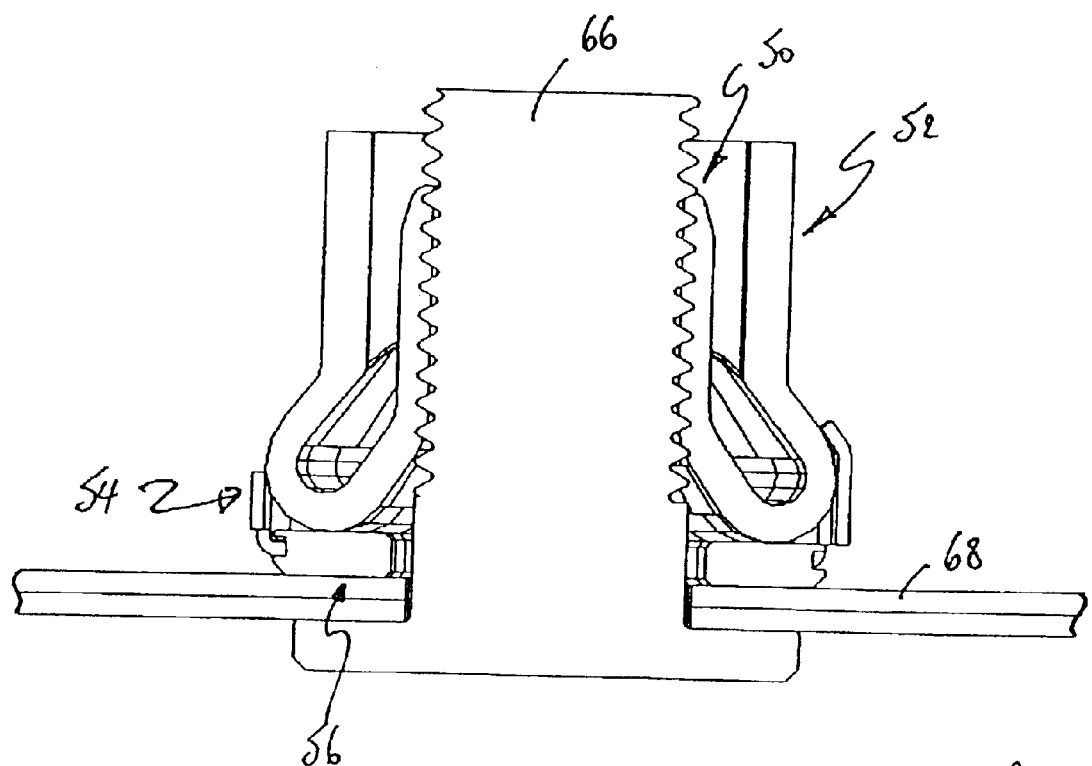
FIG. 7 is a sectional view of the second nut when tightened onto a stud.

In this way, when the nut is tightened onto a stud 66 against a component 68, as shown in FIG. 7, the washer 56 may remain stationary relative to the component, and the inner and outer portions be rotated relative to the washer and the component, so as to avoid the scoring of the surface of the component which would occur without the presence of the washer.

When the nut is tightened onto the stud 66 there is a relative axial displacement of the inner and outer portions of the nut, in which the inner portion is displaced towards the washer relative to the outer portion, such that the apex of the end surface of the inner portion is closer to the washer than the end surface of the outer portion.

Figure 8:
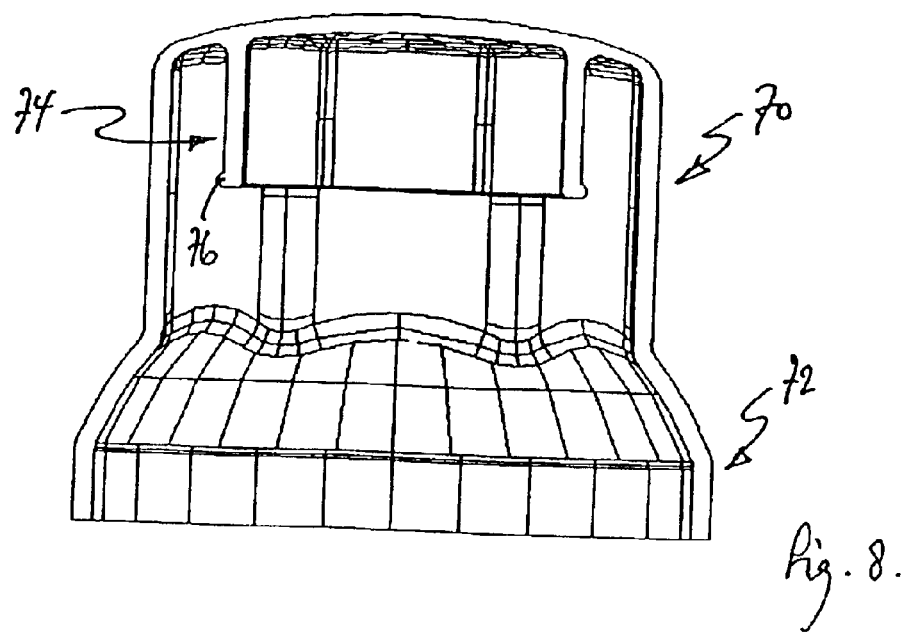
FIG. 8 is a sectional view of an indicator cap in accordance with the second aspect of the invention.

FIG. 8 shows an indicator cap that is formed from nylon-66. The cap is generally cup-shaped, having a hexagonal, parallel-sided closed end 70, and a flared circular open end 72. A central hexagonal, tubular member 74 projects from the closed end of the cap towards the open end of the cap. The end of the tubular member nearer to the open end of the cap is formed with a lip 76 that projects perpendicularly from the tubular member.

The internal dimensions of the cap are such that, but for the presence of the tubular member, the cap would form a snug fit over the second nut.

The external measurements of the lip of the tubular member are slightly larger than the internal measurements of the hexagonal neck of the outer portion of the second nut. The internal measurements of the tubular member are slightly smaller than the external diameter of the neck of the inner portion of the second nut.

Thus when the second nut is tightened onto a stud, as shown in FIG. 7, such that the inner portion is displaced towards the washer relative to the outer portion, the cap may be placed over the nut and the lip of the tubular member will deform slightly so as to engage with the internal surface of the neck of the outer portion of the nut.

Figure 9:
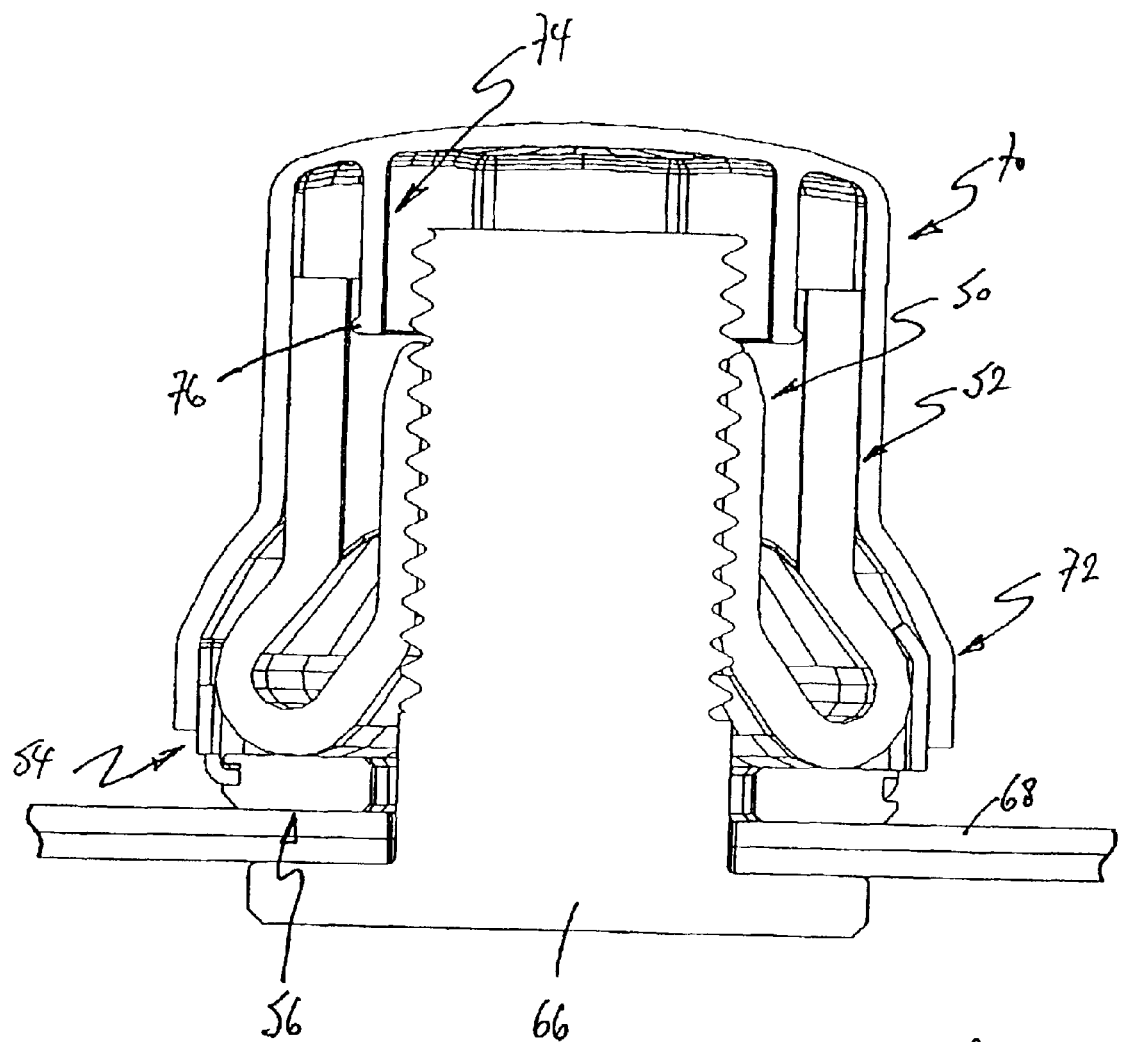
FIG. 9 is a sectional view of the second nut when tightened onto the stud and fitted with the indicator cap.

This is shown in FIG. 9. The cap is held in place by friction between the deformed lip of the cap and the internal surface of the neck of the outer portion of the nut, since the tubular member is slightly wider than the internal measurements of the neck of the outer portion.

If the nut subsequently loosens, the inner portion of the nut will move away from the washer relative to the outer portion, until the apex of the end surface of the neck of the inner portion and the end surface of the neck of the outer portion are coplanar. The external diameter of the neck of the inner portion is slightly greater than the internal measurements of the tubular member of the cap, such that as the end surface of the neck of the inner portion moves away from the washer, it engages with the tubular member and pushes the cap off the nut, thus providing a visual indication that the nut has loosened.

It will be apparent that the above description relates only to two embodiments of the invention, and that the invention encompasses other embodiments as defined by the foregoing statements of the invention.

What is claimed is:

1. A fastening element for use with a tie member to fasten a first component to a second component, the fastening element being adapted for attachment to the tie member to exert a compressive force on the components, wherein
    the fastening element comprises an outer portion and an inner portion;
    a first end of the inner portion is resiliently joined to a first end of the outer portion, in such a way that, when the fastening element is stressed, a force exerted by the tie member on the fastening element, as a result of said compressive force, causes a second, opposite end of the outer portion to be displaced relative to a second, opposite end of the inner portion;
    the second ends of the inner and outer portions have flat end faces which are coplanar when the fastening element is not stressed.

2. A fastening element according to claim 1, wherein the inner portion is formed integrally with the outer portion.

3. A fastening element according to claim 1, wherein the inner and outer portions are so positioned relative to one another that the displacement of the outer portion relative to the inner portion is an axial displacement.

4. A fastening element according to claim 1, wherein the inner portion is tapped so as to be engageable with a threaded portion of the tie member.

5. A fastening element according to claim 1, wherein the outer portion is formed with flats for engagement with a tool.

6. A fastening element according to claim 1, wherein the fastening element is formed from sheet or strip spring steel.

7. A fastening element according to claim 1, wherein the fastening element comprises a nut, for use with a tie member in the form of a bolt or stud.

8. A fastening element according to claim 7, wherein the fastening element further comprises a washer that is rotatably attached to the nut, and that, in use, is interposed between the nut and the components.

9. A fastening element according to claim 8, wherein the washer is annular, such that in use, the tie member passes through the washer.

10. A fastening element according to claim 8, wherein the fastening element further comprises a connecting part having first and second pluralities of radially inwardly projecting claws, the first plurality of claws being engageable with the nut and the second plurality of claws being engageable with the washer.

11. A fastening element according to claim 10, wherein the nut is formed with a generally frusto-conical portion and the washer is formed with a groove in an external circumference thereof, and
    the first plurality of claws are engageable with the frusto-conical portion of the nut and the second plurality of claws are engageable with the groove of the washer.

12. A fastening element according to claim 10, wherein the connecting part is formed from mild or spring steel.

13. A fastening element according to claim 8, wherein the washer is formed from hardened steel.

14. In combination, an indicator element and a fastening elements;
    the fastening element being adapted for use with a tie member to fasten a first component to a second component, for attachment to the tie member which in use passes through a part of at least one of the components, and for cooperating with the tie member to exert a compressive force on the components;
    the fastening element comprising an inner portion resiliently joined to an outer portion, in such a way that, a force exerted by the tie member on the fastening element, as a result of said compressive force, causes the outer portion to be displaced relative to the inner portion;
    the indicator element being releasably engageable with the fastening element such that the indicator element is retained by the fastening element when the outer portion of the fastening element is displaced relative to the inner portion, and released if the displacement of the outer portion relative to the inner portion decreases sufficiently.

15. The combination according to claim 14, wherein the indicator element is adapted to be engageable with an internal surface of the outer portion of the fastening element when the outer portion is displaced relative to the inner portion.

16. The combination according to claim 14, wherein the indicator element comprises a cap for placing over the fastening element, the cap having a central internal tubular member with a radially outwardly projecting lip that is engageable with an internal surface of the outer portion of the fastening element when the outer portion is displaced relative to the inner portion.

17. The combination according to claim 14, wherein the indicator element is formed from a plastics material.

18. The combination according to claim 17, wherein the indicator element is formed from nylon-66.

19. A method of securing a first component to a second component, by means of a fastener comprising a fastening element and a tie member adapted for attachment to the fastening element, the method comprising the steps of:
    passing the tie member through a part of at least one of the components;
    cooperating the fastening element with the tie member to apply a progressively increasing compressive force to the two components, wherein the fastening element comprises an inner portion resiliently joined to an outer portion, in such a way that, a force exerted by the tie member on the fastening element, as a result of said compressive force, causes the outer portion to be displaced relative to the inner portion; and determining whether a displacement of the inner portion relative to the outer portion reaches a minimum magnitude indicative of the soundness of the attachment of the two components;

wherein said determining comprises engaging an indicator element with the fastening element, and observing whether the indicator element is retained by the fastening element.

20. A method according to claim 19, wherein the indicator element is releasably engageable with the fastening element such that the indicator element is retained by the fastening element when the outer portion of the fastening element is displaced relative to the inner portion, and released if the displacement of the outer portion relative to the inner portion decreases sufficiently.

21. A method according to claim 19, wherein the inner portion of the fastening element is tapped and the tie member has a matching threaded portion, the compressive force being applied by screwing the tapped inner portion of the fastening element onto the threaded portion of the tie member.

22. A method according to claim 19, wherein the outer portion of the fastening element is formed with flats for engagement with a tool, and the compressive force is applied by applying a torque to the fastening element using said tool.

23. A method of securing a first component to a second component, by means of a fastener comprising a fastening element and a tie member adapted for attachment to the fastening element, the method comprising the steps of:

passing the tie member through a part of at least one of the components, cooperating the fastening element with the tie member to exert a progressively increasing compressive force to the two components, wherein the fastening element comprises an inner portion resiliently joined to an outer portion, in such a way that, a force exerted by the tie member on the fastening element, as a result of said compressive force, causes the outer portion to be displaced relative to the inner portion; and determining whether a displacement of the inner portion relative to the outer portion reaches a minimum magnitude indicative of the soundness of the attachment of the two components;

wherein said determining includes measuring the displacement of the inner portion relative to the outer portion.

24. A method of securing a first component to a second component, by means of a fastener comprising a fastening element and a tie member adapted for attachment to the fastening element, the method comprising the steps of:

passing the tie member through a part of at least one of the components;

cooperating the fastening element with the tie member to exert a progressively increasing compressive force to the two components, wherein the fastening element comprises an inner portion resiliently joined to an outer portion, in such a way that, a force exerted by the tie member on the fastening element, as a result of said compressive force, causes the outer portion to be displaced relative to the inner portion;

determining whether a displacement of the inner portion relative to the outer portion reaches a minimum magnitude indicative of the soundness of the attachment of the two components; and determining whether the displacement of the inner portion relative to the outer portion is less than a maximum magnitude, corresponding to a maximum desired magnitude of compressive force.

25. A method according to claim 24 wherein the step of determining whether the displacement reaches a minimum magnitude includes visual inspection of the displacement of the inner portion relative to the outer portion.

26. A fastener comprising a nut and a bolt for use therewith;

said nut comprising an inner tubular portion and an outer tubular portion;

each of said inner and outer portions having opposite first and second ends;

the first ends of said inner and outer portions being resiliently joined to one another;

the inner portion defining a passage extending between the first and second ends of said inner portion:

said nut further comprising a plurality of threads extending over a predetermined axial extent of said passage to define a threaded region, a remaining portion of said passage being unthreaded up to said first end of said inner portion; and said bolt entering the passage from the first end of the inner portion and comprising threads matching and effecting threaded contact with the threads of the threaded region of the nut so as to exert a force on the nut, which force causes the second end of the inner portion to be displaced relative to the second end of the outer portion.

27. The fastener of claim 26, wherein said outer portion, in a region corresponding to the unthreaded portion of said passage, flares in a direction from the first end towards the second end of said outer portion so as to form an enlarged base of said nut.

28. The fastener of claim 27, wherein said inner portion, in a region corresponding to the unthreaded portion of said passage, also flares in the direction from the first end towards the second end of said outer portion so as to physically contact the outer portion in said enlarged base of said nut.

29. The fastener of claim 26, wherein an outer surface of the second end of said inner portion physically contacts an inner surface of the second end of said outer portion.

30. The fastener of claim 29, wherein the outer surface of the second end of said inner portion is a cylindrical surface and the inner surface of the second end of said outer portion is a planar surface.

* * * * *